United States Patent
Harada et al.

(10) Patent No.: US 10,097,036 B2
(45) Date of Patent: *Oct. 9, 2018

(54) UNINTERRUPTIBLE POWER SOURCE DEVICE

(71) Applicant: FDK CORPORATION, Tokyo (JP)

(72) Inventors: Takuya Harada, Tokyo (JP); Takashi Kabasawa, Tokyo (JP); Jinichi Sakamoto, Tokyo (JP)

(73) Assignee: FDK CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/324,263

(22) PCT Filed: May 21, 2015

(86) PCT No.: PCT/JP2015/064601
§ 371 (c)(1),
(2) Date: Jan. 5, 2017

(87) PCT Pub. No.: WO2016/996329
PCT Pub. Date: Jan. 14, 2016

(65) Prior Publication Data
US 2017/0187234 A1    Jun. 29, 2017

(30) Foreign Application Priority Data
Jul. 7, 2014    (JP) .................. 2014-139584

(51) Int. Cl.
*H02J 9/06* (2006.01)
*H02J 7/00* (2006.01)

(52) U.S. Cl.
CPC ............ *H02J 9/061* (2013.01); *H02J 7/0068* (2013.01)

(58) Field of Classification Search
CPC .................. H02J 9/061; H02J 7/0068
See application file for complete search history.

(56) References Cited

U.S. PATENT DOCUMENTS 5,811,895 A * 9/1998 Suzuki .................. H02J 9/061
                                                              307/116
5,898,234 A * 4/1999 Kitagawa .................. H02J 9/06
                                                              307/48

(Continued)

FOREIGN PATENT DOCUMENTS

JP    07-087686         3/1995
JP    2002369407 A    12/2002

(Continued)

OTHER PUBLICATIONS

International Search Report (English translation) and Written Opinion dated Aug. 4, 2015 for corresponding PCT Application No. PCT/J132015/064601.

(Continued)

*Primary Examiner* — Daniel Kessie
(74) *Attorney, Agent, or Firm* — Kinney & Lange, P.A.

(57) ABSTRACT

An uninterruptible power source device 10 in the present invention includes: an input-output terminal 11 that is connected in parallel with a power source line 21 through which electric power is supplied from an external power source 20 to a loading device 30; a battery unit 12 whose rated voltage is lower than a voltage V1 of the external power source 20; a DC/DC converter 13 that converts a voltage V2 of the battery unit 12 into a voltage V3 equivalent to a difference between the voltage V1 of the external power source 20 and the voltage V2 of the battery unit 12; a charging circuit 14 that charges the battery unit 12 through the input-output terminal 11 with the electric power of the external power source 20; and a discharging circuit 15 that performs discharge to the loading device 30 through the input-output terminal 11 at a voltage resulting from adding an output voltage V3 of the DC/DC converter 13 to the voltage V2 of (Continued)

the battery unit 12, at the time of electric power interruption of the external power source 20.

4 Claims, 5 Drawing Sheets

(56) References Cited

U.S. PATENT DOCUMENTS

| | | | | |
|---|---|---|---|---|
| 6,204,633 | B1* | 3/2001 | Kitagawa | H02J 7/0068 320/128 |
| 6,291,973 | B1* | 9/2001 | Lee | H02J 7/0031 320/128 |
| 6,525,666 | B1* | 2/2003 | Shimoda | H02J 9/005 340/635 |
| 6,777,913 | B2* | 8/2004 | You | H02J 7/0013 320/125 |
| 7,202,634 | B2* | 4/2007 | Bucur | H02J 7/0018 320/137 |
| 7,761,718 | B2* | 7/2010 | Yasuo | G06F 1/263 307/43 |
| 8,324,758 | B2* | 12/2012 | Ogg | H02J 9/061 307/65 |
| 2002/0191421 | A1* | 12/2002 | Liao | H02M 3/335 363/17 |
| 2004/0066179 | A1 | 4/2004 | Wu et al. | |
| 2004/0113585 | A1* | 6/2004 | Stanesti | H02J 7/0018 320/116 |
| 2006/0078773 | A1* | 4/2006 | Speranza | H01M 8/04626 429/9 |
| 2009/0160500 | A1* | 6/2009 | Niculae | H02M 1/08 327/109 |
| 2010/0253147 | A1* | 10/2010 | Ogg | H02J 9/061 307/65 |
| 2012/0105008 | A1* | 5/2012 | Lipcsei | H02J 7/0031 320/134 |
| 2014/0217820 | A1* | 8/2014 | Imai | H02J 7/0068 307/26 |

FOREIGN PATENT DOCUMENTS

| | | |
|---|---|---|
| JP | 2012120414 A | 6/2012 |
| JP | 3183220 U | 5/2013 |
| JP | 2013110899 A | 6/2013 |

OTHER PUBLICATIONS

Extended European Search Report, for European Patent Application No. 15818521.5, dated Jan. 2, 2018, 7 pages.

* cited by examiner

UNINTERRUPTIBLE POWER SOURCE DEVICE

TECHNICAL FIELD

The present invention relates to an uninterruptible power source device.

BACKGROUND ART

An uninterruptible power source device is a power source device that supplies electric power from a previously charged secondary battery to a loading device for continuing the operation of the loading device, in a state in which electric power is not supplied from an external power source to the loading device due to electric power interruption or the like. The secondary battery of the uninterruptible power source device is generally charged with the electric power of the external power source, at normal times. As an example of the secondary battery that is used in the uninterruptible power source device, an alkaline secondary battery such as a nickel-hydrogen secondary battery is publicly known, for example.

The alkaline secondary battery, from its nature, needs to be charged at a voltage that is higher than the rated voltage. However, generally, in the uninterruptible power source device, the rated voltage of the alkaline secondary battery is the same as the voltage of the external power source. Therefore, at that voltage, the alkaline secondary battery cannot be charged to a full-charge state, with the electric power of the external power source.

For this reason, there is publicly known an uninterruptible power source device including an auxiliary power source (DC/DC converter) that raises the voltage of the external power source. More specifically, at the time of the charge of the alkaline secondary battery, the voltage of the external power source is raised by the auxiliary power source, and the alkaline secondary battery is charged at the raised voltage. Thereby, even in the case of an alkaline secondary battery with a rated voltage that is the same as the voltage of the external power source, the alkaline secondary battery can be charged to the full-charge state, at a voltage that is higher than the rated voltage. Further, although not an uninterruptible power source device, as an example of the technology that uses the auxiliary power source, there is publicly known a motor control device to increase, by the auxiliary power source, the amount of the electric power that can be supplied to an electric motor, when the electric power demand of the electric motor increases temporarily (see Patent Document 1, for example).

PRIOR ART DOCUMENT

Patent Document

Patent Document 1: Japanese Patent Laid-Open No. 2013-110899

SUMMARY OF THE INVENTION

Problems to be Solved by the Invention

However, the conventional uninterruptible power source device has a problem in that a large electric power loss is produced because the voltage of the external power source is raised by the auxiliary power source at the time of the charge of the secondary battery. Further, in the conventional uninterruptible power source device, there is a fear that the secondary battery cannot be charged when the auxiliary power source breaks down for some reasons, and thereby, there is a fear of the decrease in reliability.

The present invention has been made in view of such a circumstance, and an object thereof is to provide an uninterruptible power source device with a smaller electric power loss and a higher reliability.

Means for Solving the Problems

<First Aspect of the Present Invention>

A first aspect of the present invention is an uninterruptible power source device including: an input-output terminal that is connected in parallel with a power source line through which electric power is supplied from an external power source to a loading device; a battery unit whose rated voltage is lower than a voltage of the external power source; a voltage converting device that converts a voltage of the battery unit into a voltage equivalent to a difference between the voltage of the external power source and the voltage of the battery unit; a charging circuit that charges the battery unit through the input-output terminal with the electric power of the external power source; and a discharging circuit that performs discharge to the loading device through the input-output terminal at a voltage resulting from adding an output voltage of the voltage converting device to the voltage of the battery unit, at the time of electric power interruption of the external power source.

Since the rated voltage of the battery unit is lower than the voltage of the external power source in this way, the battery unit can be charged to the full-charge state with the electric power of the external power source, with no change. That is, unlike the conventional manner, without using the auxiliary power source, the battery unit can be charged at a voltage that is higher than the rated voltage of the battery unit. Thereby, it is possible to reduce the fear that the battery unit cannot be charged, and therefore, it is possible to enhance the reliability of the uninterruptible power source device.

Meanwhile, at the time of the electric power interruption, the voltage of the battery unit is converted into the voltage equivalent to the difference between the voltage of the external power source and the voltage of the battery unit, by the voltage converting device, and the discharge to the loading device is performed at the voltage resulting from adding the output voltage of the voltage converting device to the voltage of the battery unit. Thereby, at the time of the electric power interruption, it is possible to supply electric power to the loading device at the same voltage as the voltage of the external power source. Then, since the voltage converting device converts the voltage of the battery unit into the voltage equivalent to the difference between the voltage of the external power source and the voltage of the battery unit, the electric power loss in the voltage converting device is much smaller than that in the conventional technology in which the voltage of the external power source is raised. Thereby, it is possible to considerably reduce the electric power loss in the uninterruptible power source device.

Thereby, the first aspect of the present invention gives a function effect of being able to provide an uninterruptible power source device with a smaller electric power loss and a higher reliability.

<Second Aspect of the Present Invention>

A second aspect of the present invention, in the above-described first aspect of the present invention, is an uninterruptible power source device further including a control device that adjusts the output voltage of the voltage converting device depending on decrease in the voltage of the battery unit, such that the voltage resulting from adding the output voltage of the voltage converting device to the voltage of the battery unit is a voltage equivalent to the voltage of the external power source, at the time of the electric power interruption of the external power source.

According to the second aspect of the present invention, at the time of the electric power interruption, even when the voltage of the battery unit decreases, for example, due to the consumption of the electric power of the battery unit, it is possible to supply electric power to the loading device at the same voltage as the voltage of the external power source. Thereby, it is possible to suppress the fluctuation in the output voltage of the uninterruptible power source device.

<Third Aspect of the Present Invention>

A third aspect of the present invention, in the above-described first aspect or second aspect of the present invention, is an uninterruptible power source device in which the discharging circuit connects an output of the voltage converting device and the battery unit with the input-output terminal by diode-or connection.

According to the third aspect of the present invention, even if the breakdown or the like occurs in the voltage converting device, at the time of the electric power interruption, it is possible to supply electric power to the loading device at the voltage of the battery unit at that time. Accordingly, even in such a case, it is possible to continue the operation of the loading device by the electric power of the battery unit, at least while the voltage of the battery unit is within the acceptable range of the operating voltage of the loading device, and therefore, the reliability of the uninterruptible power source device does not greatly decrease. Further, for example, at the time of the electric power interruption, the operation of the voltage converting device may be stopped and the electric power of the battery unit may be directly supplied to the loading device, while the voltage of the battery unit is within the acceptable range of the operating voltage of the loading device. Thereby, it is possible to reduce the electric power loss in the uninterruptible power source device.

<Fourth Aspect of the Present Invention>

A fourth aspect of the present invention, in any of the above-described first to third aspects of the present invention, is an uninterruptible power source device in which the charging circuit includes a step-down device that reduces the voltage of the external power source to a charging voltage of the battery unit.

According to the fourth aspect of the present invention, it is possible to use a battery unit having a charging voltage that is lower than the voltage of the external power source, and therefore, it is possible to flexibly deal with battery units with various specifications.

Advantageous Effects of the Invention

According to the present invention, it is possible to provide an uninterruptible power source device with a smaller electric power loss and a higher reliability.

MODE FOR CARRYING OUT THE INVENTION

Hereinafter, embodiments of the present invention will be described with reference to the drawings.

Needless to say, the present invention is not particularly limited to the embodiments described below, and various modifications can be made within the range of the invention described in CLAIMS.

<Configuration of Uninterruptible Power Source Device 10>

The configuration of an uninterruptible power source device 10 according to the present invention will be described with reference to FIG. 1.

Figure 1:
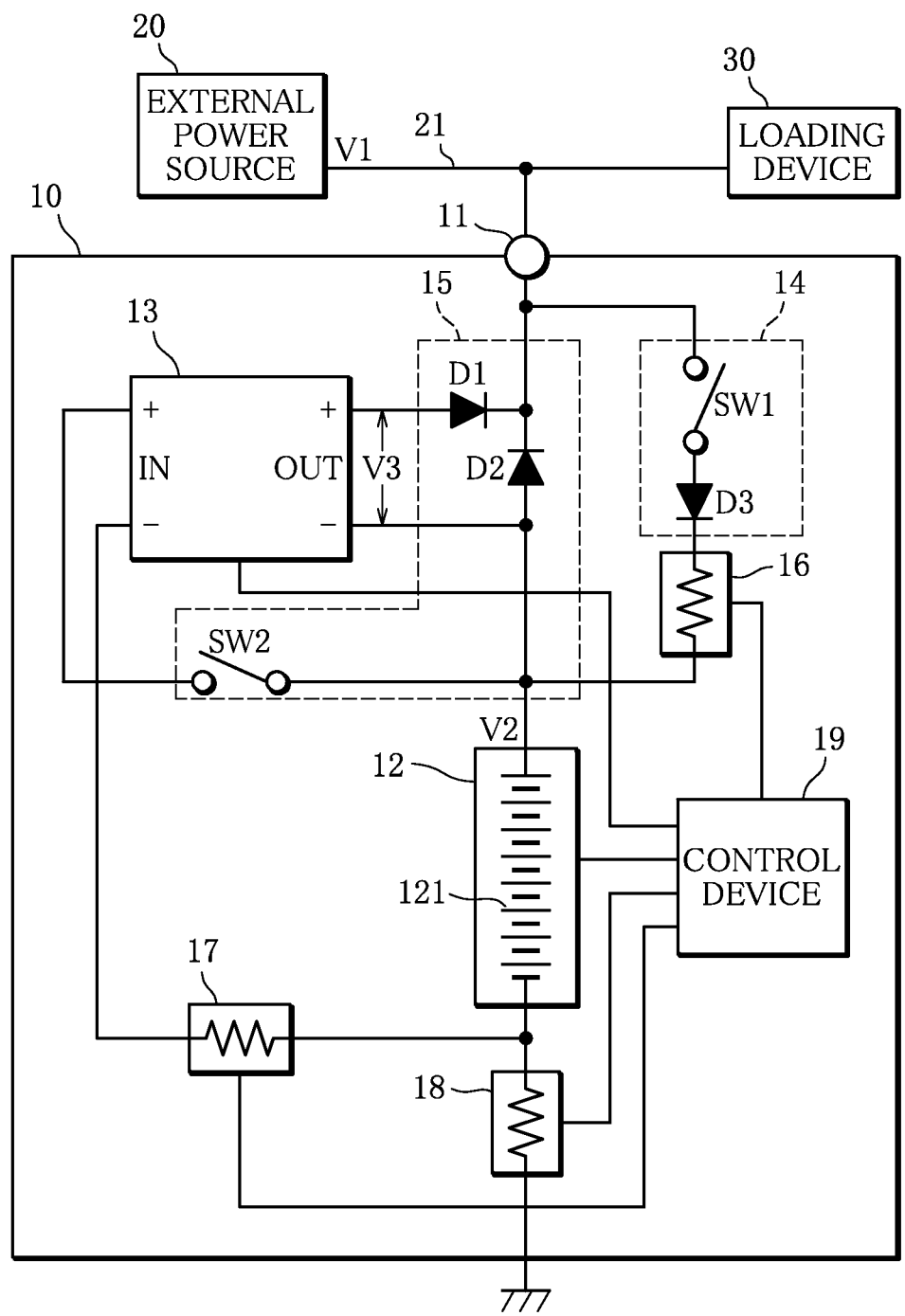
FIG. 1 is a circuit diagram illustrating the configuration of an uninterruptible power source device.

FIG. 1 is a circuit diagram illustrating the configuration of the uninterruptible power source device 10.

The uninterruptible power source device 10 is a power source device that supplies electric power to a loading device 30 for continuing the operation of the loading device 30, in a state in which electric power cannot be supplied from an external power source 20 to the loading device 30 due to electric power interruption or the like.

The uninterruptible power source device 10 includes an input-output terminal 11, a battery unit 12, a DC/DC converter 13, a charging circuit 14, a discharging circuit 15, first to third current detecting circuits 16 to 18, and a control device 19.

The input-output terminal 11 is connected in parallel with a power source line 21 through which electric power is supplied from the external power source 20 to the loading device 30. Here, the external power source 20, for example, is a power source device that converts commercial alternating-current power into a direct-current power having a voltage V1. Further, the loading device 30 is an electronic device that operates by the direct-current power having the voltage V1.

The battery unit 12 is a battery power source having a rated voltage that is lower than the voltage V1 of the external power source 20. The battery unit 12 includes a battery pack 121 configured such that alkaline secondary batteries such as nickel-hydrogen secondary batteries are connected in series or in parallel. Further, the battery unit 12 includes a circuit that detects the voltage and temperature of the battery pack 121 (the illustration is omitted).

The DC/DC converter 13, which is a "voltage converting device", reduces a voltage V2 of the battery unit 12 to convert it into a voltage V3 equivalent to the difference between the voltage V1 of the external power source 20 and the voltage V2 of the battery unit. More specifically, the DC/DC converter 13 is an input-output isolation type step-down DC/DC converter. It is preferable that the DC/DC converter 13 is configured to be able to adjust the output voltage by a control signal from the control device 19.

The charging circuit 14 includes a switch SW1 and a diode D3. More specifically, the anode of the diode D3 is connected with the input-output terminal 11 through the switch SW1. The cathode of the diode D3 is connected with the positive electrode terminal of the battery unit 12. In the charging circuit 14 having such a configuration, when the switch SW1 is turned on, the battery unit 12 is charged through the input-output terminal 11 with the electric power of the external power source 20. Accordingly, the charging voltage of the battery unit 12 is the voltage V1 of the external power source 20.

The discharging circuit 15 includes a switch SW2, a diode D1 and a diode D2. More specifically, on the input side of the DC/DC converter 13, the + terminal is connected with the positive electrode terminal of the battery unit 12 through the switch SW2, and the − terminal is connected with the ground. Further, on the output side of the DC/DC converter 13, the + terminal is connected with the anode of the diode D1, and the − terminal is connected with the positive electrode terminal of the battery unit 12. The cathode of the diode D1 is connected with the input-output terminal 11. The positive electrode terminal of the battery unit 12 is connected with the anode of the diode D2, and the cathode of the diode D2 is connected with the input-output terminal 11. That is, the positive electrode terminal of the battery unit 12 is connected with the input-output terminal 11 through the diode D2. The negative electrode terminal of the battery unit 12 is connected with the ground.

Thus, the discharging circuit 15 connects the output side of the DC/DC converter 13 and the battery unit 12 with the input-output terminal 11 by diode-or connection. In the discharging circuit 15 having such a configuration, the voltage to be output to the input-output terminal 11 through the diode D1 is the voltage resulting from adding the output voltage V3 of the DC/DC converter 13 to the voltage V2 of the battery unit 12. On the other hand, the voltage to be output to the input-output terminal 11 through the diode D2 is the voltage V2 of the battery unit 12. Accordingly, in a state in which the voltage is being output from the DC/DC converter 13, the electric power of the battery unit 12 is discharged from the diode D1 through the input-output terminal 11 to the loading device 30, at the voltage resulting from adding the output voltage V3 of the DC/DC converter 13 to the voltage V2 of the battery unit 12. On the other hand, in a state in which the voltage is not being output from the DC/DC converter 13, the electric power of the battery unit 12 is discharged from the diode D2 through the input-output terminal 11 to the loading device 30, at the voltage V2 of the battery unit 12.

The first current detecting circuit 16 is provided between the diode D3 and the positive electrode terminal of the battery unit 12, and detects the charging current of the battery unit 12. The second current detecting circuit 17 is provided between the − terminal on the input side of the DC/DC converter 13 and the negative electrode terminal of the battery unit 12, and detects the current on the input side of the DC/DC converter 13. The third current detecting circuit 18 is provided between the negative electrode terminal of the battery unit 12 and the ground, and detects the discharging current of the battery unit 12. The first to third current detecting circuits 16 to 18, for example, are current detecting circuits that use shunt resistors.

The control device 19 is a publicly-known microcomputer control device. The control device 19 executes the on/off of the switch SW1 and switch SW2, the adjustment of the output voltage V3 of the DC/DC converter 13, and the like, based on the detection currents of the first to third current detecting circuits 16 to 18, the voltage V2 and temperature of the battery unit 12, and the like.

<Operation of Uninterruptible Power Source Device 10>

The operation of the uninterruptible power source device 10 will be described with reference to FIG. 2 to FIG. 4.

Figure 2:
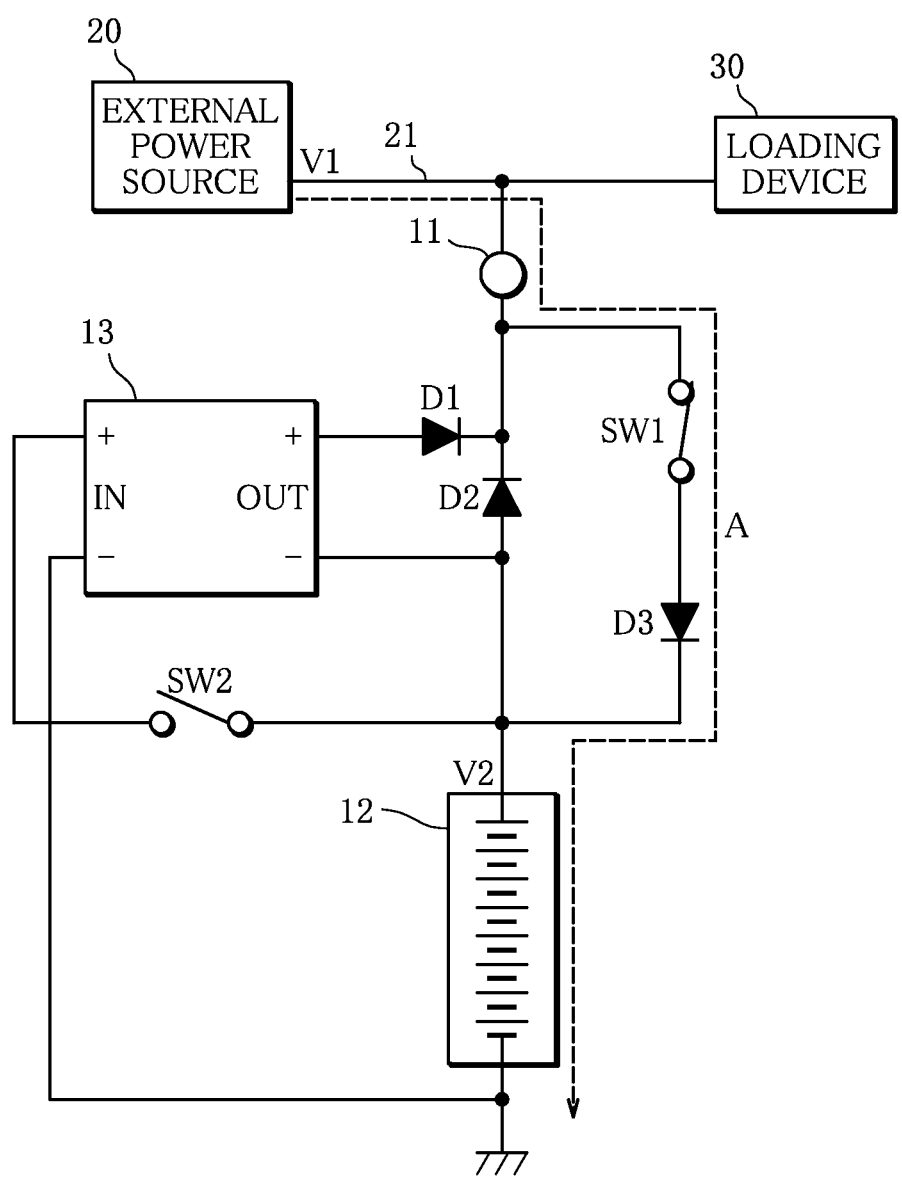
FIG. 2 is a circuit diagram illustrating a main part of the uninterruptible power source device at normal times.

FIG. 2 is a circuit diagram illustrating a main part of the uninterruptible power source device 10, and is a diagram illustrating the uninterruptible power source device 10 at normal times.

At normal times, that is, in the state in which electric power is being supplied from the external power source 20 to the loading device 30, the battery unit 12 is charged to a full-charge state with the electric power of the external power source 20. More specifically, the switch SW2 is turned off, and the switch SW1 is turned on. Thereby, the electric power of the external power source 20 is supplied to the battery unit 12, so that the battery unit 12 is charged (reference character A). Then, after the battery unit 12 is charged to the full-charge state, the switch SW1 is turned off.

Since the rated voltage of the battery unit 12 is lower than the voltage V1 of the external power source 20 as described above, the battery unit 12 can be charged to the full-charge state with the electric power of the external power source 20, with no change. That is, unlike the conventional manner, without using an auxiliary power source, the battery unit 12 can be charged at the voltage V1 that is higher than the rated voltage of the battery unit 12. Thereby, it is possible to reduce the fear that the battery unit 12 cannot be charged, and therefore, it is possible to enhance the reliability of the uninterruptible power source device 10.

Figure 3:
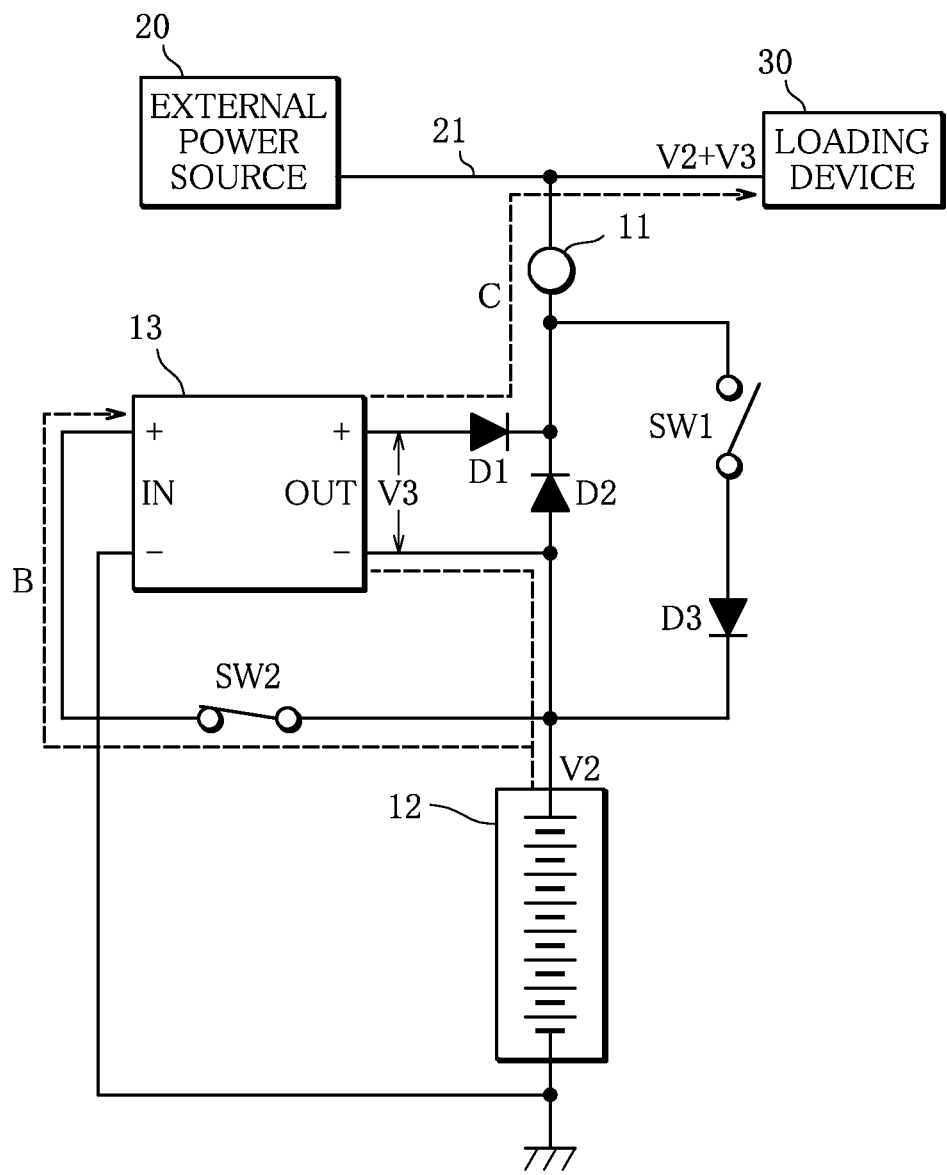
FIG. 3 is a circuit diagram illustrating the main part of the uninterruptible power source device at the time of electric power interruption.

FIG. 3 is a circuit diagram illustrating the main part of the uninterruptible power source device 10, and is a diagram illustrating the uninterruptible power source device 10 at the time of the electric power interruption.

At the time of the electric power interruption, that is, in the state in which electric power is not supplied from the external power source 20 to the loading device 30, the electric power of the battery unit 12 is discharged to the loading device 30 through the input-output terminal 11. More specifically, at the time of the electric power interruption, the switch SW1 is turned off, and the switch SW2 is turned on. Thereby, the electric power of the battery unit 12 is discharged to the loading device 30 through the diode D1, at the voltage resulting from adding the output voltage V3 of the DC/DC converter 13 to the voltage V2 of the battery unit 12 (reference characters B and C). Thereby, at the time of the electric power interruption, the electric power can be supplied to the loading device 30, at the same voltage (voltage V2+V3) as the voltage V1 of the external power source 20. Then, the DC/DC converter 13 converts the voltage V2 of the battery unit 12, into the voltage V3 equivalent to the difference between the voltage V1 of the external power source 20 and the voltage V2 of the battery unit 12. Accordingly, the electric power loss in the DC/DC converter 13 is much smaller than that in the conventional technology in which the voltage of the external power source 20 is raised. Thereby, it is possible to considerably reduce the electric power loss in the uninterruptible power source device 10.

Further, it is preferable that the output voltage V3 of the DC/DC converter 13 is adjusted depending on the decrease in the voltage V2 of the battery unit 12, such that the voltage resulting from adding the output voltage V3 of the DC/DC converter 13 to the voltage V2 of the battery unit 12 is a voltage equivalent to the voltage V1 of the external power source 20. Thereby, although this is not an essential constituent element of the present invention, it is possible to supply electric power to the loading device 30 at the same voltage as the voltage V1 of the external power source 20, even when the voltage V2 of the battery unit 12 decreases.

Thereby, it is possible to suppress the fluctuation in the output voltage (voltage V2+V3) of the uninterruptible power source device 10.

Figure 4:
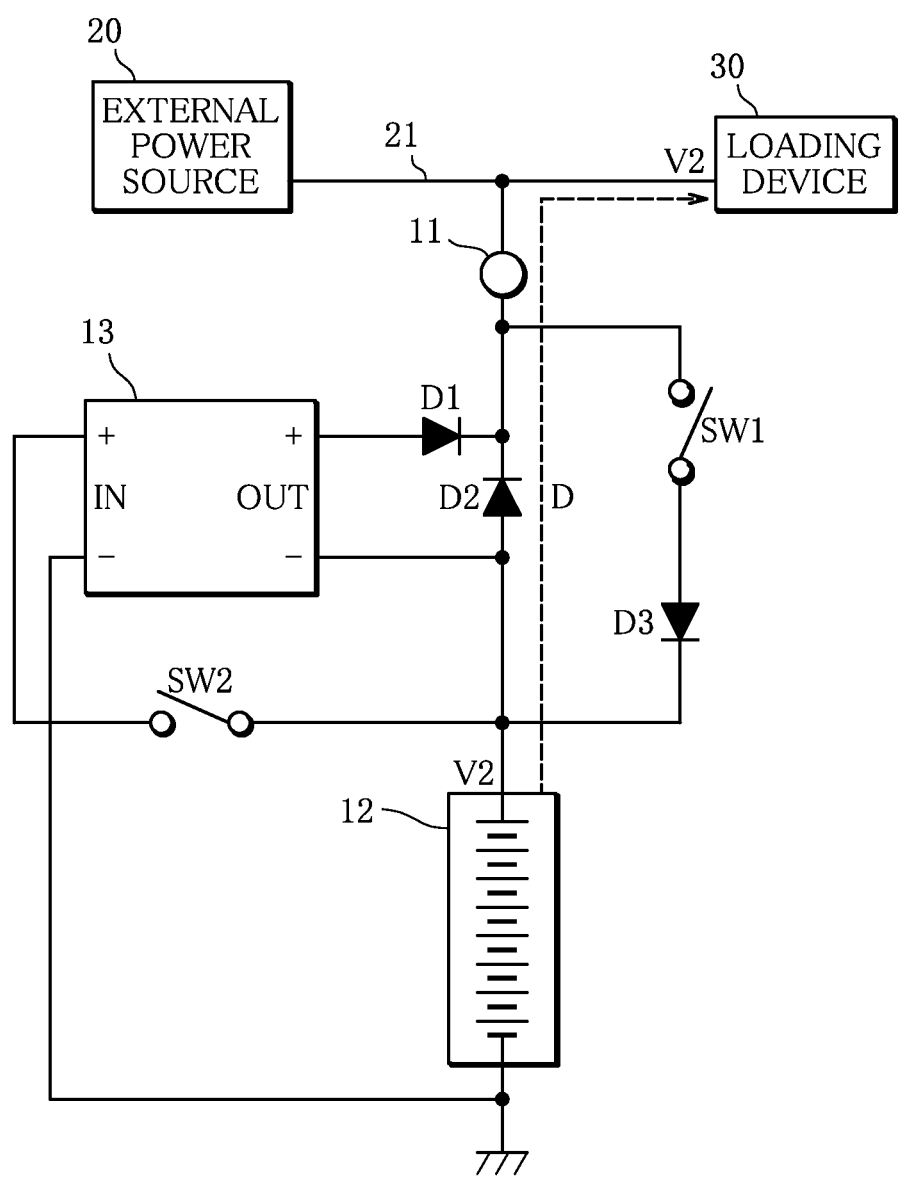
FIG. 4 is a circuit diagram illustrating the main part of the uninterruptible power source device in a state in which a DC/DC converter does not operate at the time of the electric power interruption.

FIG. 4 is a circuit diagram illustrating the main part of the uninterruptible power source device 10, and is a diagram illustrating a state in which the DC/DC converter 13 does not operate at the time of the electric power interruption.

As described above, at the time of the electric power interruption, the uninterruptible power source device 10 discharges the electric power of the battery unit 12 to the loading device 30 through the input-output terminal 11. At this time, when the switch SW2 is turned off, or when the breakdown or the like occurs in the DC/DC converter 13, the voltage is not output from the DC/DC converter 13. However, as described above, the output of the DC/DC converter 13 and the battery unit 12 are connected with the input-output terminal 11 by diode-or connection. Thereby, in the state in which the voltage is not output from the DC/DC converter 13, the electric power of the battery unit 12 is directly supplied to the loading device 30 through the diode D2 (reference character D).

Accordingly, for example, in the case where the breakdown or the like occurs in the DC/DC converter 13 at the time of the electric power interruption, it is possible to continue the operation of the loading device 30 by the electric power of the battery unit 12, at least while the voltage V2 of the battery unit 12 is within the acceptable range of the operating voltage of the loading device 30, and therefore, the reliability of the uninterruptible power source device 10 does not greatly decrease. Further, for example, at the time of the electric power interruption, the switch SW2 may be kept in the off-state and the electric power of the battery unit 12 may be directly supplied to the loading device 30, while the voltage V2 of the battery unit 12 is within the acceptable range of the operating voltage of the loading device 30. Thereby, it is possible to reduce the electric power loss in the uninterruptible power source device 10.

As described above, according to the present invention, it is possible to provide the uninterruptible power source device 10 with a smaller electric power loss and a higher reliability.

<Modification>

A modification of the uninterruptible power source device 10 according to the present invention will be described with reference to FIG. 5.

Figure 5:
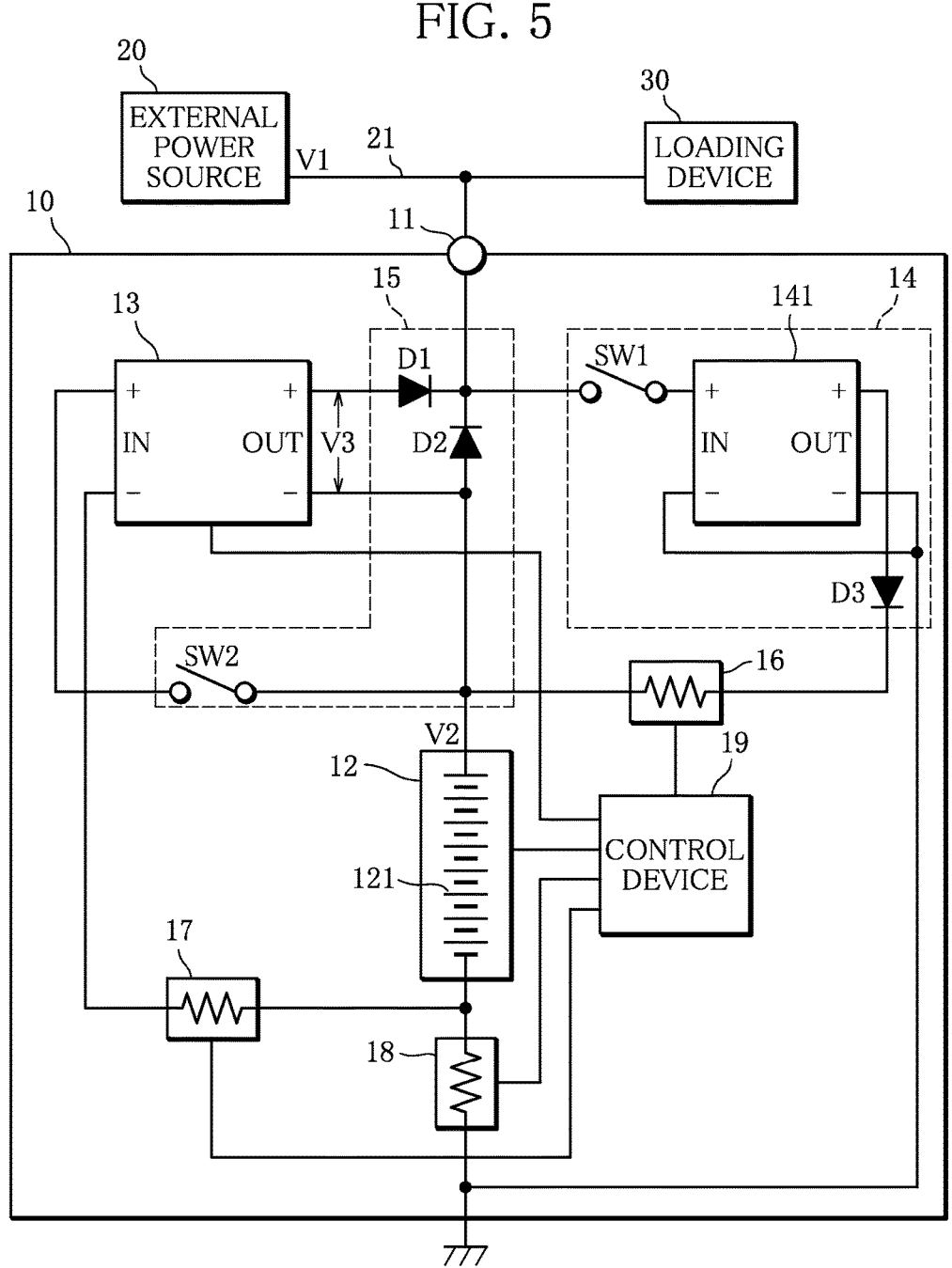
FIG. 5 is a circuit diagram illustrating the configuration of a modification of the uninterruptible power source device.

FIG. 5 is a circuit diagram illustrating the configuration of the modification of the uninterruptible power source device 10. The configuration of the modification of the uninterruptible power source device 10 is different in the configuration of the charging circuit 14, from that of the embodiment illustrated in FIG. 1. The other constituents have the same configurations as those of the embodiment illustrated in FIG. 1. Therefore, the same reference characters are assigned to the same constituent elements, and the detailed description is omitted.

The charging circuit 14 in the modification includes the switch SW1, the diode D3 and a DC/DC converter 141. The DC/DC converter 141, which is a "step-down device", is an input-output isolation type step-down DC/DC converter, for example, and is a device that reduces the voltage V1 of the external power source 20 to the charging voltage of the battery unit 12. More specifically, in the charging circuit 14 according to the modification, one end side of the switch SW1 is connected with the input-output terminal 11, and the other end side of the switch SW1 is connected with the + terminal on the input side of the DC/DC converter 141. The − terminal on the input side and the − terminal on the output side of the DC/DC converter 141 are connected with the ground. The + terminal on the output side of the DC/DC converter 141 is connected with the anode of the diode D3. The cathode of the diode D3 is connected with the positive electrode terminal of the battery unit 12.

In the charging circuit 14 having such a configuration, when the switch SW1 is turned on, the battery unit 12 is charged at the output voltage of the DC/DC converter 141. Then, since the DC/DC converter 141 reduces the voltage V1 of the external power source 20 to the charging voltage of the battery unit 12, the battery unit 12 can be charged to the full-charge state at an appropriate charging voltage. Even with such a mode, the present invention can be carried out, and it is possible to use, for example, a battery unit 12 having a charging voltage that is lower than the voltage V1 of the external power source 20. Therefore, it is possible to flexibly deal with battery units 12 with various specifications.

EXPLANATION OF REFERENCE SIGNS 10 uninterruptible power source device
11 input-output terminal
12 battery unit
13 DC/DC converter
14 charging circuit
15 discharging circuit
16 to 18 first to third current detecting circuits
19 control device
20 external power source
21 power source line
30 loading device

The invention claimed is:

1. An uninterruptible power source device comprising:
an input-output terminal that is connected in parallel with a power source line through which electric power is supplied from an external power source to a loading device;
a battery unit whose rated voltage is lower than a voltage of the external power source;
a voltage converting device that converts a voltage of the battery unit into an output voltage equivalent to a difference between the voltage of the external power source and the voltage of the battery unit;
a charging circuit that charges the battery unit through the input-output terminal with the electric power of the external power source; and
a discharging circuit that performs discharge to the loading device through the input-output terminal at a voltage resulting from adding the output voltage of the voltage converting device to the voltage of the battery unit, at a time of electric power interruption of the external power source.

2. The uninterruptible power source device according to claim 1, further comprising a control device configured to adjust the output voltage of the voltage converting device depending on decrease in the voltage of the battery unit, such that the voltage resulting from adding the output voltage of the voltage converting device to the voltage of the battery unit is a voltage equivalent to the voltage of the external power source, at the time of the electric power interruption of the external power source.

3. The uninterruptible power source device according to claim 1, wherein the discharging circuit connects an output of the voltage converting device and the battery unit with the input-output terminal by diode-or connection.

4. The uninterruptible power source device according to claim 1, wherein the charging circuit includes a step-down device that reduces the voltage of the external power source to a charging voltage of the battery unit.

\* \* \* \* \*